United States Patent [19]

Leonard

[11] 3,937,118

[45] Feb. 10, 1976

[54] INVERSION SLIDERULE

[76] Inventor: Verna M. Leonard, 8701 Highway 41, Fresno, Calif.

[22] Filed: Apr. 17, 1975

[21] Appl. No.: 568,995

[52] U.S. Cl. ................................ 84/471 SR; 84/473

[51] Int. Cl.[2] ........................................ G09B 15/02

[58] Field of Search .............................. 84/471–474, 84/477–482

[56] References Cited

UNITED STATES PATENTS

| | | | |
|---|---|---|---|
| 856,358 | 6/1907 | Morris | 84/478 |
| 2,938,421 | 5/1960 | Leonard | 84/473 X |
| 3,395,600 | 8/1968 | Leonard | 84/478 |
| 3,621,750 | 11/1971 | Leonard | 84/471 |
| 3,728,931 | 4/1973 | Leonard | 84/471 |

*Primary Examiner*—John F. Gonzales
*Attorney, Agent, or Firm*—Verna M. Leonard

[57] ABSTRACT

The invention is a musical aid used to simplify the comprehension of chord inversion structure and enable the composer to more readily visualize the keyboard location and fingering of chords and their inversions used in a composition, the device having a frontal panel display of the scale tones of a particular key signature and a sliding member behind the panel which is provided with numbered, pivotal indicators to select a triad orderd in the root or an inverted position from the Scale tones on the panel, the invention including a rotatable disc on the sliding member having selectively exposeable chords displayed on the periphery thereof naming the triads and their inversions occuring in the key signature of the panel.

7 Claims, 5 Drawing Figures

INVERSION SLIDERULE

BACKGROUND OF THE INVENTION

In playing of compositions on a keyboard instrument, the chording, which is accomplished by the left hand, is normally confined to a keyboard range of about 11 notes extending from middle C downward. Chording must therefore be arranged carefully to fall within the appropriate bounds, the chording being further complicated by the need to select inversions of the desired chords which are fingered such that a smooth transition between chords is achieved. When composing the base chording, it is difficult to mentally arrange the chords such that they meet these objectives. There is a need, therefore, for a composing aid capable of graphically indicating the finger positioning of a keyboard-like representation to simplify this procedure.

SUMMARY OF THE INVENTION

The present invention is in accord with the above mentioned objectives and comprises a lower panel having a display of the named scale tones of a particular key signature, and a backing sheet joined to the lower margin of the front panel to define an upwardly open pocket, the backing sheet optionally displaying a musical staff having notes thereon represented by the scale tones named on the panel. A slide member seated in the pocket may be provided with a row of indicators spaced to select the scale tones of a particular chord type from the panel as this member is adjusted laterally in the pocket, and an upwardly extending portion of the sliding member is provided with commonly pivoted scale tone indicator strips, which in one embodiment are three pointers used to individually select the individual scale tones from the panel which comprise either the root, first inverted, or second inverted position of a triad, and in the other embodiment these strips being two in number each pointing out the scale tones of the first and second inversions, respectively, from the panel. A dial with selectively exposable peripheral chord designations may be pivotally mounted on the slide member so that the chord which is selected on the dial may be then indicated on the panel by the appropriate indicator strips.

DETAILED DESCRIPTION OF THE PREFERRED EMBODIMENT

Figure 1:
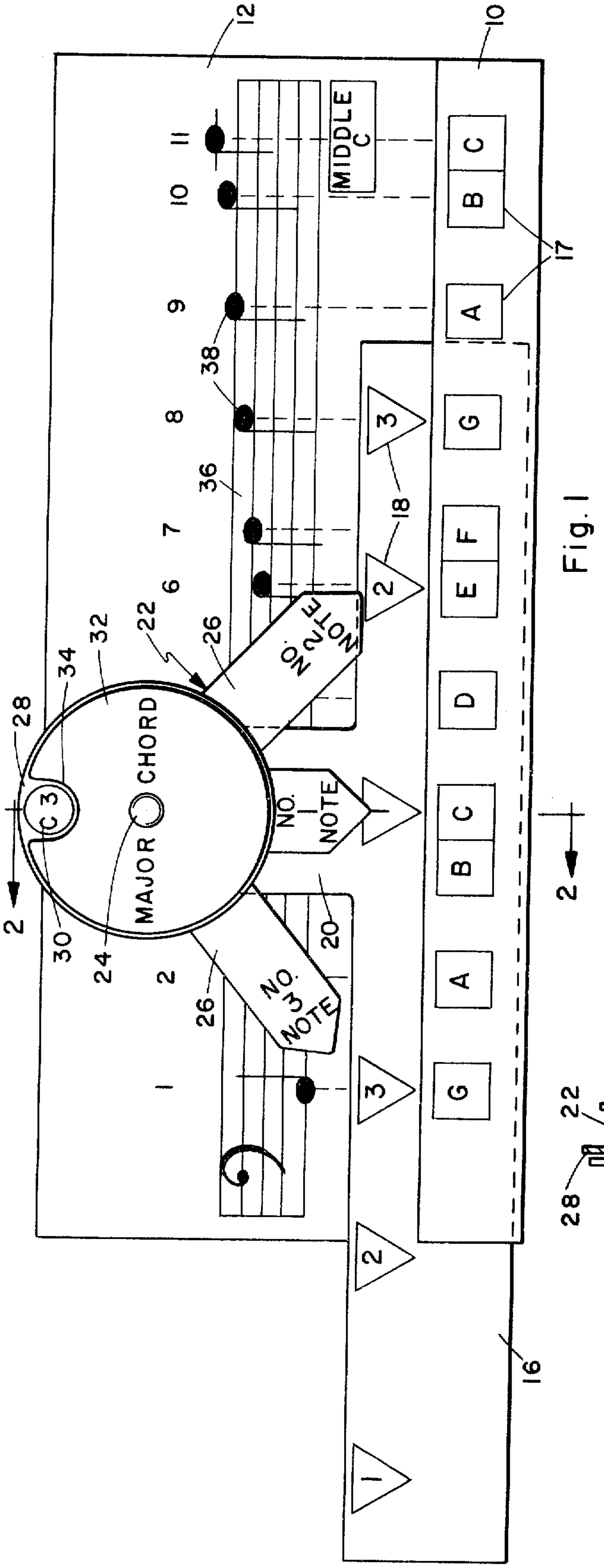
FIG. 1 is a front elevation view of the invention set up for the C-3 chord.

The invention comprises a front panel 10 and a backing sheet 12 joined to and preferably integral with the lower margin of the panel to define a fold or pocket 14. The front panel is provided with an arrangement of indicia 16 naming the scale tones in a particular key signature, the illustrated embodiment representing the key of "C" but of course, any key signature could be used. The scale tones 17 should be spaced according to the spacing of the represented keys of a piano, although the scale may be reduced.

Resting in the pocket 14 is a sliding member 16 which may have spaced markings 18 as illustrated in FIG. 1, these markings so positioned and numbered to register with the scale tones of a major triad when the slide is properly adjusted. FIG. 1 illustrates the slide set up to register with the component scale tones of the C major chords, these tones being C′, E, and G. The slide can be moved to register with the F and G major triads as well, these three being the principal triads in the key of C.

A portion 20 of the sliding member extends upwardly and defines a mounting position for indicator strips, generally indicated at 22, which are pivotally mounted by a brad 24 or the like. There are two types of indicators, represented in FIGS. 1–3 and 4–5 respectively, the basic purpose of both types being the same, which is to indicate alternatively the root and inverted positions of different triads as the slide member is laterally adjusted.

Figure 3:
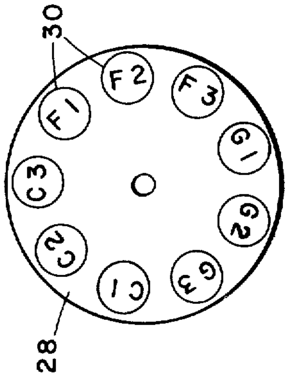
FIG. 3 is a front elevational detail of the chord inversion disc.
Figure 2:
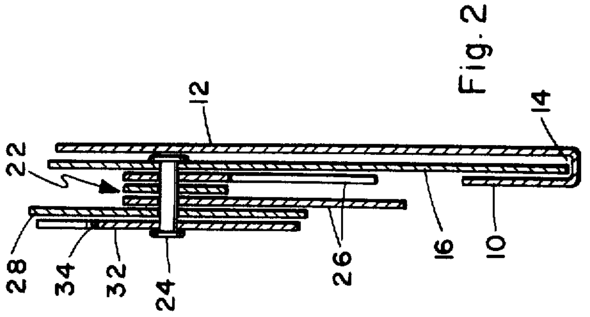
FIG. 2 is a section taken along lines 2—2 of FIG. 1.

In the first embodiment, shown in FIGS. 1–3, the indicator strips comprise three pointers 26, each of which is labeled with a number from 1 to 3. The numbers signify that the pointer is to be used to indicate the scale tone which occurs in the order of the number in the root chord. For example, in the position illustrated the second inversion of the C chord is selected, so that the pointer labeled 3 points to the left of the C, indicating that in the root or base C chord G occurs as the third note, and so forth. E is indicated as the second note in the root or base chord, although occuring as the third tone in the second inversion.

The brad 24 may also serve as a mounting for a rotational dial 28, which is provided with a peripheral array 30 of the symbols of the three principal traids in the key of C and their inversions. The dial is covered by a blind 32 having a window 34 therein to expose any selected one of the chords or inversions on the dial.

In the operation of the first embodiment of the invention, the user selects a particular chord on the dial, for example C3 as shown in FIG. 1, C3 being an alternative designation of the second inversion of C. With the chord selected, the slide positioned in the pocket as shown so that the indicia 1 thereon aligns with the C scale tones, the pointers 26 are pivoted to select the scale tones of the C3 chords. Inasmuch as only the 11 notes are shown which correspond to the base chording range of piano keyboard, any chord thus selected will fall within the proper bounds, and the fingering will be graphically illustrated by the pointers to facilitate the choice of the next chord used so that smooth fingering transitions can be established for consecutive chords.

The backing sheet 12 of the first embodiment of the invention may be provided with a musical staff 36 above the scale tones 17, together with the notes 20 corresponding to the underlying named scale tones, the purpose of these notes being to enable the user to immediately interpret chords he selects on the panel into written music.

Figure 5:
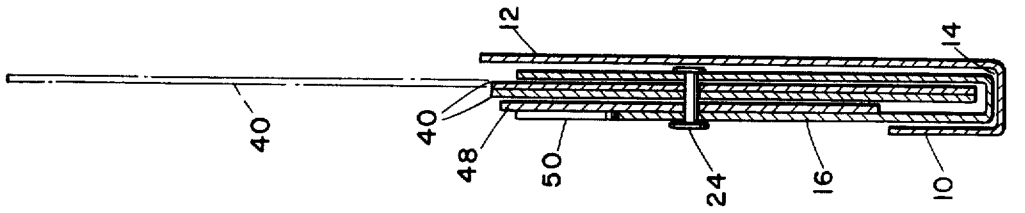
FIG. 5 is a section taken along lines 2—2 of FIG. 4.
Figure 4:
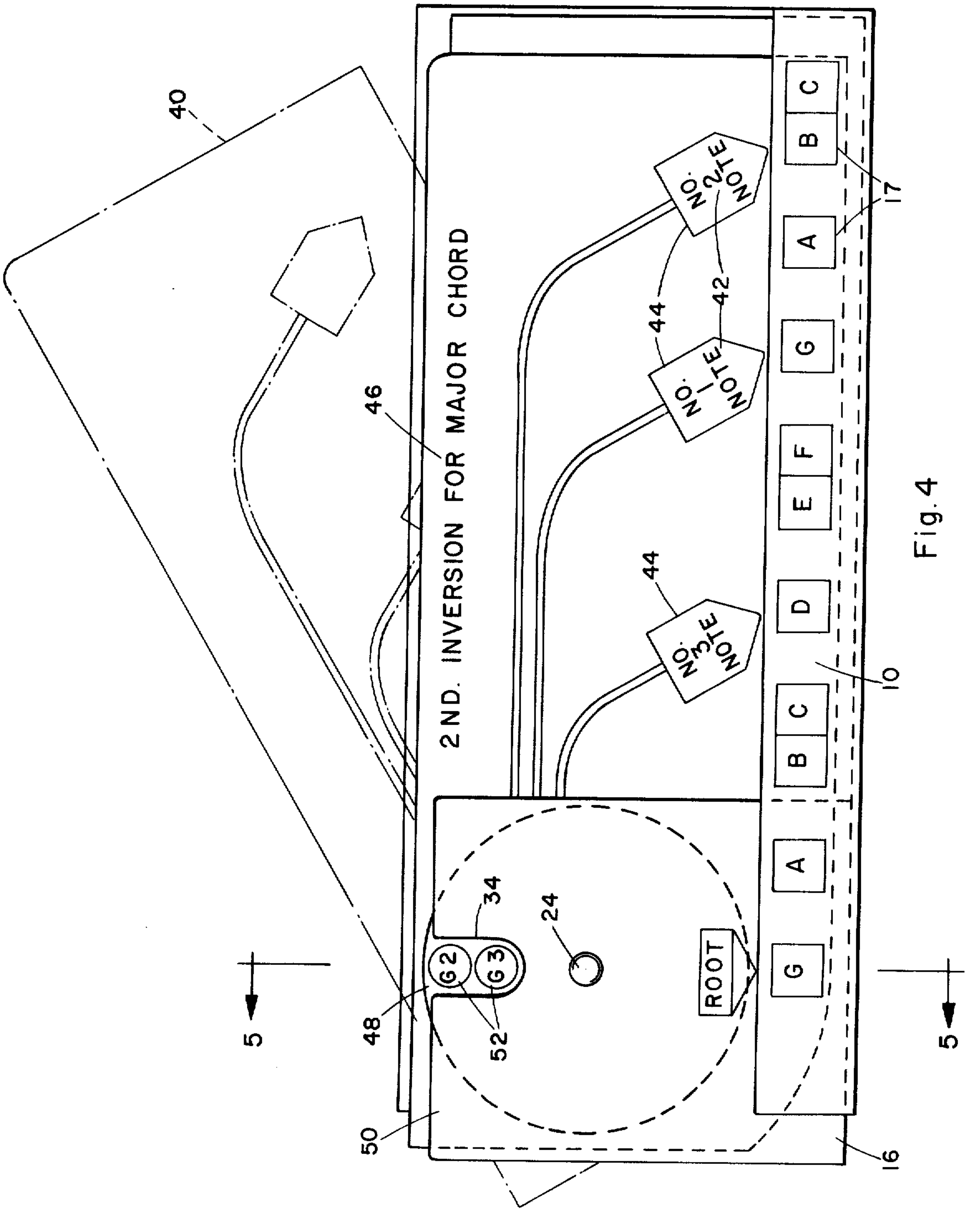
FIG. 4 is a front elevation view of a modification of the invention set up for the first inversion of the G major triad.

A modification of the invention, illustrated in FIGS. 4–5 utilizes indicator strips which are panel-like as at 40, in the place of the pointers 26. These strips each have indicia such as the arrows 42 which point out the notes in the order named at 44 of a particular inversion, identified on the strip at 46. Two of these strips are used to represent the first and second inversion, and of course a third strip could be added to show the root position. A dial 48 is provided, along with a blind 50, similar to the first embodiment, the indicia 52 on the dial being grouped chord inversion symbols.

I claim:

1. An aid for selecting chord inversions comprising:

a. a panel having displayed thereon the names of the scale tones of a given key signature, the relative spacing between said scale tone names being proportional to the spacing of the counterpart keys of a piano keyboard;

b. a generally planar slide member;

c. means to slideably engage said slide member with said panel;

d. a plurality of indicator strips pivoted to said slide member and pivotal into a position in which said strips register with a plurality of said named scale tones, whereby upon sliding said sliding member relative to said panel and the selective pivoting of said strips into said registering position, a root triad or an inversion thereof may be alternatively selected on said panel sequentially for a plurality of different root tones.

2. Structure according to claim 1 wherein said panel has an upwardly extended portion displaying a musical staff and notes on the staff corresponding to the respective named scale tones on said panel immediately below said notes.

3. Structure according to claim 2 wherein said extended portion comprises a backing sheet joined to said panel along the lower margin thereof to define an upwardly open fold, said planar slide member being slideably seated in said fold and having spaced indicia thereon immediately above said named scale tones and registerable therewith, said indicia being spaced to select the scale tones of a particular chord type.

4. Structure according to claim 2 wherein said slide member has an upward extension and said indicator strips comprise three pointer mounted to said upward extension, whereby said pointers can be pivoted to indicate the scale tones of the root or an inverted position of a plurality of triads from said panel.

5. Structure according to claim 4 and including a disc rotationally mounted on said slide member, said disc having a peripheral array of indicia naming the three principal triads and the inversions thereof of the key signature represented on said panel, and including a cover mounted over said dial and having an opening therein to expose an individual and selected one of said named triads, whereby a triad may be selected and the scale tones constituting said selected triad indicated with said pointers.

6. Structure according to claim 1 wherein said indicator strips each have spaced indicia thereon to register with the scale tones of an inversion of a triad selected from the scale tones of said panel.

7. Structure according to claim 6 wherein said indicator strips are two in number to represent the second and third inversions of a triad, and including a rotatable disc naming in a peripheral annular array the second and third inversions of a plurality of different triads.

* * * * *